Patented Dec. 24, 1929

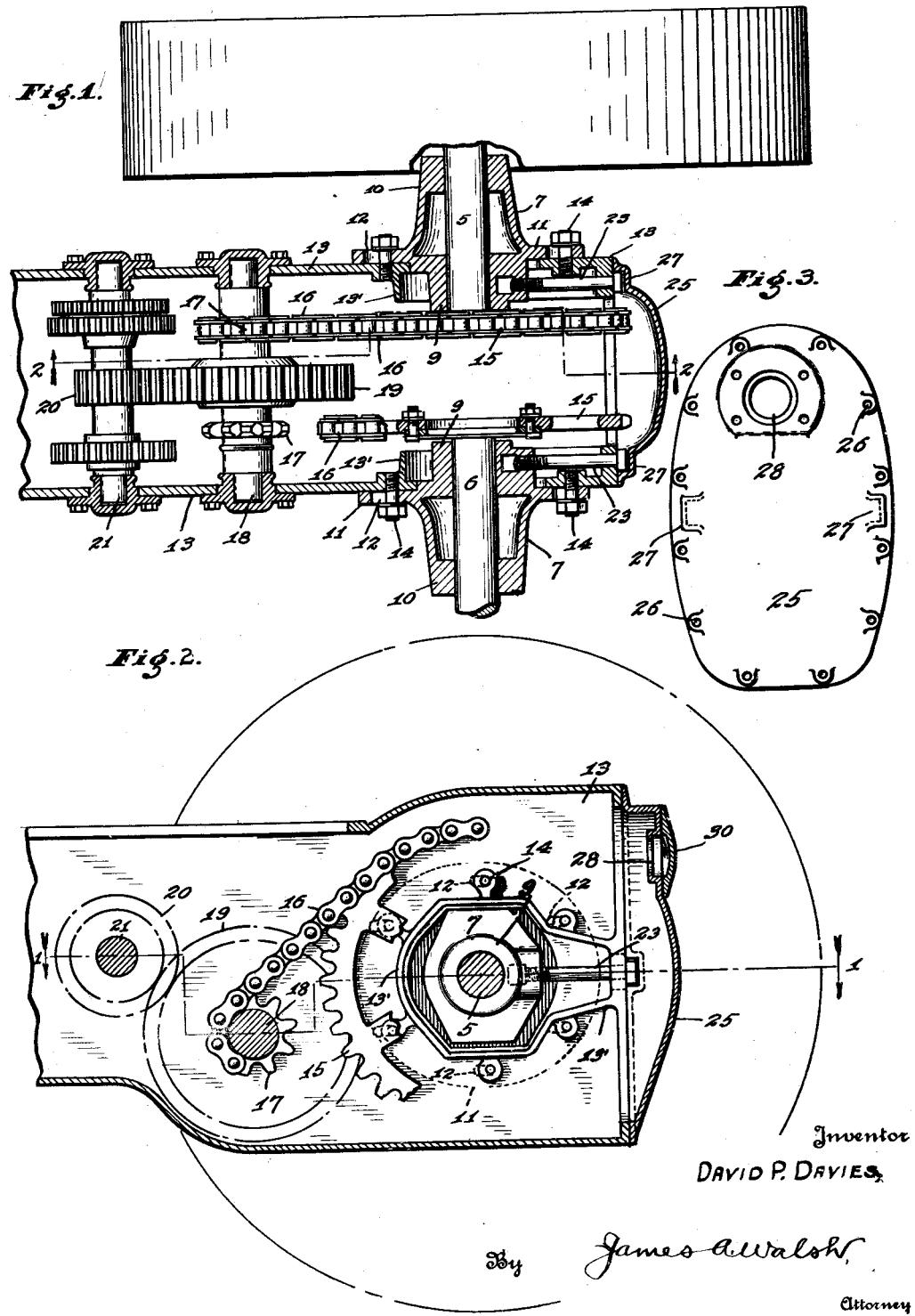

1,740,810

UNITED STATES PATENT OFFICE

DAVID P. DAVIES, OF RACINE, WISCONSIN, ASSIGNOR TO J. I. CASE COMPANY, OF RACINE, WISCONSIN, A CORPORATION

TRACTOR

Application filed August 3, 1928. Serial No. 297,268.

My invention relates to the type of tractors which embody a divided driving axle each section of which is connected by sprockets and chains to transmission mechanism and driven thereby, my object being to provide adjustable means for readily and independently tightening the chains to obtain efficient driving power and also for loosening such chains to remove them from the sprockets which they connect, my improvement also including means associated with the casing enclosing said driving mechanisms whereby ready access may be had to the latter and to said adjusting means, as will hereinafter more fully appear.

In the accompanying drawing, forming part hereof, Figure 1 is a horizontal sectional view of that portion of a tractor embodying my improvements, as seen when looking in the direction indicated by the arrows 1—1 in Fig. 2; Fig. 2, a longitudinal sectional view taken on the dotted line 2—2 in Fig. 1, and Fig. 3 is an elevation of a cover and bolt-locking plate which I employ.

In said drawing I have illustrated a tractor provided with a divided driving axle comprising the sections 5, 6, journaled in sliding bearing carriers, 7, each of said bearings embodying an inner hub, 9, an outer hub, 10, and a flange, 11, the latter having slotted bolt holes, 12, therein, by which they are secured to the casing 13 embodying reinforcing ribs 13', with studs, 14, said casing enclosing the transmission, differential and other mechanisms in a dust-proof manner and which is designed to contain a supply of oil for lubricating the actuating mechanisms therein. Each axle section at its inner end is provided with a sprocket, 15, which is connected by a driving chain, 16, to a sprocket, 17, on the differential shaft, 18, which latter carries a gear, 19, meshing with a pinion, 20, on transmission shaft, 21, power being transmitted to said latter shaft by any conventional train of gears located between it and the engine (not shown) for driving the differential shaft, 18, and the chains connected thereto and to the axle sections. As it becomes necessary occasionally to tighten or loosen one or the other or both of the driving chains 16, I may readily accomplish such adjustment by means of the bolts 23, which are threaded into the inner hubs 9 of the carriers 7 and extend through the end of casing 13, where said bolts are in convenient position to be turned in the desired direction to either advance the carrier so that the chain may be detached or to draw such carrier rearwardly in order to tighten the chain, these movements of the carriers in longitudinal relation to the casing 13 being obtained by loosening the studs 14 which pass through the slotted holes 12 in the flange 11 of the bearing carrier, which permits ready shifting of the carrier back and forth as the bolts 23 are turned, and in which manner it will be apparent that the carriers may be independently adjusted for the purposes stated.

As indicated, the actuating mechanisms such as the transmission, differential and driving chains are contained within the casing 13 the rear end of which has an opening therein adapted to be closed by a cover plate, 25, so that when it is desired to obtain access to the interior of casing 13 for installing sprockets upon axle sections 5, 6, adjusting the bolts 23, or otherwise, this may be accomplished by removing said cover. As stated, the heads of bolts 23 lie upon the outside of casing 13 and are accessible for adjustment when cover 25 has been removed, and when such adjustment has been made the cover is replaced and secured to casing 13 by bolts passing through the holes 26 and into the casing. Said cover 25 is provided with pockets, 27, so positioned as to neatly fit the heads of bolts 23, which pockets serve as means for locking the bolts and retaining them in the position to which they have been adjusted, and when the cover has been secured to the casing 13 the mechanisms therein are protected from dust and extraneous matter. In tractors of the character to which my improvement relates it is the practice to associate therewith a power take-off shaft (not shown) which passes through the interior of casing 13 and extends beyond the rear end of the tractor to be connected to an implement or machine, and for which purpose I provide a bearing, 28, in cover 25, which bearing is sealed by a closure, 30, when the tractor is not equipped with such power take-off, but when it is desired to install a take-off mechanism the closure may be removed to permit the power take-off shaft to project through the cover as stated.

I claim as my invention:

1. The combination, in a tractor, of a casing embodying upper, lower and side walls and having an opening in its end, driving mechanism enclosed in the casing, bearing carriers in the casing, a divided axle supported by said carriers, a sprocket on the inner end of each section of said axle, chains within said casing connecting each of said sprockets and the driving mechanism, bolts supported in the casing and connected to the carriers for independently adjusting each of the axle sections toward and from the driving mechanism to tighten and loosen said chains, and a cover for the opening in the casing embodying means for locking and retaining said bolts in adjusted position.

2. The combination, in a tractor, of a casing embodying upper, lower and side walls and having an opening in its end, driving mechanism enclosed in the casing, bearing carriers in the casing, a divided axle supported by said carriers, a sprocket on the inner end of each section of said axle, chains within said casing connecting each of said sprockets and the driving mechanism, bolts supported in the casing and connected to the carriers for independently adjusting each of the axle sections toward and from the driving mechanism to tighten and loosen said chains, and a cover for the opening in the casing embodying pockets which fit about the heads of said bolts for locking the same in adjusted position.

3. The combination, in a tractor, of a casing, a bearing carrier having slotted bolt holes therein, means for securing said carrier to the casing whereby the carrier may be adjusted in relation to the casing, a bolt mounted in the casing and connected to the carrier for adjusting the latter, and a cover plate for the casing embodying means for locking and preventing the bolt from turning.

4. The combination, in a tractor, of a casing, oppositely disposed bearing carriers mounted in said casing and shiftable in longitudinal relation thereto, axle sections mounted in said bearing carriers, adjusting bolts threaded in said carriers and extending to the outside of said casing, a cover plate for closing the casing, and means associated with the cover plate for locking and retaining the bolts from turning when in adjusted position.

In testimony whereof I affix by signature.

DAVID P. DAVIES.